United States Patent Office 3,420,671
Patented Jan. 7, 1969

3,420,671
FEED AND FORAGE PELLETS AND PROCESS
FOR PRODUCING THE SAME
Earl H. Hess and Donald R. Tshudy, Lancaster, Pa., assignors to Lancaster Laboratories, Inc., Lancaster, Pa., a corporation of Pennsylvania
No Drawing. Filed Mar. 5, 1964, Ser. No. 349,738
U.S. Cl. 99—2     10 Claims
Int. Cl. A23k 1/20

ABSTRACT OF THE DISCLOSURE

A compressed animal feed of subdivided forage and a binder produced by subjecting starchy material to enzyme treatment and cooking at elevated temperature and pressure.

This invention relates to the production of feed and forage pellets for use as poultry and stock feed and particularly for cattle. It is especially directed to a method or process for the production of such pelletized feeds employing a special binder which contributes to the strength of the pellet and to its nutritional value. Our invention is concerned with the method of producing the binder as well as with the resulting pelletized feed product.

In a more specific aspect of our invention various grains such as corn, barley, wheat, rye, oats and the like or other carbohydrate-containing vegetable materials e.g. potatoes are treated according to a unique process which will be hereinafter described and the resulting product is employed as a binder to pelletize grain and forage crops such as clover and alfalfa and various grasses, i.e., hay generally, or mixtures thereof. Our invention is also applicable to pelletize a wide variety of animal feeds which would include the grains, various protein and feed meals such as soybean meal, fish meal and the like and in admixture with the forage materials to produce complete animal rations in pelletized form.

The general process of making a pelletized feed is well known and consists in mixing the feed ingredients for example alfalfa hay chopped to suitable sizes with a suitable binder, using several percent for example of the latter, and molding or extruding the mixture to produce a pellet or briquette the size of which depends on the ultimate use.

The use of pelletized feeds has been widely adopted and is becoming increasingly popular because of convenience in handling as well as an actual saving in the feed consumed by preventing waste and losses when loose feeds, or feeds in meal form are used in the feeding trough. It will be readily recognized that unless the pellets are compact and firm and are resistant to attrition during handling, the basis for their use is defeated, and it is among the prime objects of our invention to correct the widespread defects in this respect by the use of a special binder. This binder is both economical to produce and use and lends itself particularly to smooth production of the pellets because of the lubricity factor as well as being nutritious and appetizing to the animal. Moreover the pellets produced by the use of our binder are relatively permanent and resistant to handling and storage but at the same time they have the desirable property of being readily acted upon when subjected to the fluids of the animal's digestive system all of which are desirable characteristics.

In a broad aspect the preparation of the binder which we employ in connection with our invention consists in converting high carbohydrate cereal grains or other vegetable matter in such a manner that they develop adhesive qualities as pellet binders not previously possessed by them. It is believed that this conversion is accomplished at least in large part by hydrolysis and hydration resulting in partial depolymerization of the starch substances contained in such grains under select conditions of treatment. Preferably this conversion is accomplished by the use of enzymes which bring about the change with essentially no loss in food value and which generate a high degree of adhesive qualities which it is believed makes our process superior both from the viewpoint of quality of the product and economic feasibility. It is also to be emphasized that the conversion of the grains by our process yields a product more readily soluble in water and that the solution possesses lower viscosities than those of the cereal grains which are simply hydrated but not depolymerized. Above all the converted products possess high nutritional value and excellent feed pellet binding qualities so that by their use in relatively small amounts the energy requirements for pelletizing operations is reduced, the output is increased and the desirable characteristics of the pelletized products are improved generally.

While it is desired that the use of other methods of hydrolysis of the grains for use as a binder, such as the use of dilute acids at elevated temperatures, come within the scope of our invention it is to be understood that such alternative methods are definitely not equivalent to our preferred method of employing enzymes as the hydrolytic agent.

In the above discussion we have emphasized the hydrolytic effect of the enzymes on starch. However it is recognized that most commercial amylases possess other types of enzyme activity as well for example a proteolytic action wherein such enzymes act upon the grain protein which may contribute at least in part to the binding action of the product. Therefore we desire not to be limited by a precise explanation of the chemistry of our process. It is believed however that the predominant chemical changes are hydration accompanied by partial depolymerization of the carbohydrate fraction with the result, of course, that the treated grains are partially solubilized.

In carrying out the process we have found that hydration of the grain is accelerated at elevated temperatures and although the process may be carried out by raising to a boiling (or near boiling) temperature at atmospheric pressures we prefer cooking up to pressures of 15 p.s.i.g. and above.

In this connection we have found that best results are obtained by a two step treatment for example the cooking step and the enzyme treatment step. The sequence of the two steps does not substantially affect the result so far as physical properties of the product is concerned, but there are some advantages in carrying out the enzyme treatment first followed by cooking as the final step, since in the latter sequence enzyme denaturation occurs and the grain is sterilized, which facilitates handling and storage of the finished product without excessive degradation or spoilage.

The amount of the hydrolytic product to be mixed with the chopped alfalfa or other forage material or animal feed generally varies from about 1% to 5% more or less by weight, preferably about 1% to about 3% on a dry basis, depending on the type of binder and other factors.

After mixing, the resulting material is subjected to sufficient pressure to compress the mixture into durable pellets or briquettes preferably upward of 1000 p.s.i. to several thousand p.s.i., employing conventional equipment of the extrusion, piston or rotary types to carry out this step of the process. In general depending upon the variables of the type of forage, the moisture content, the amount of binder and its water content and other variables, the compression pressures on the low range to pelletize may vary from about 200 p.s.i. to about 500 p.s.i. or higher. In general the range of compression pressures required are those to which conventional pelletizing machines are readily adaptable, e.g., of the order of several hundred to about five thousand p.s.i.

Examples

(I) Preparation of binding agents (A) *Slurry Form.*—The grain, which may consist of corn, barley, oats, wheat and the like or a mixture thereof, was crushed and ground, e.g., in a hammermill equipped with a fine mesh screen. The finely divided grain was then mixed with water in the present example in the proportion of one part grain to three parts water, and about one-tenth of one percent by weight of a commercial amylolytic enzyme preparation (e.g. of the type described as a liquifying diastase of bacterial origin, Rohm and Haas Rhozyme H-39) added and the mixture was then allowed to incubate for about two hours at a temperature of about 45° C. (Since commercial enzyme preparations vary widely in their diastatic activity, the amount of enzyme necessary to effect the grain conversion will also vary.) The mixture was then transferred to a pressure cooker, and cooked for about 15 minutes at a steam pressure of about 15 p.s.i.g. (121° C.). The product thus produced could be mixed with about three parts of water by weight or sufficient to produce a slurry which could be easily mixed with chopped alfalfa or other forage product or crushed grain.

The binder product as described above is usually in the form of a heavy syrup containing very small suspended particles and may be used directly as a binder (or mixed with water as stated) through the liquid injection system usually found in pellet mills. Alternatively, if desired, or found necessary, the product of the processed cereal grain may be dried and reduced to a fine powder prior to use. Preferably the drying operation in such cases should be of the type where the product is not exposed to high temperatures for long periods, such as treatment in processes of the spray dryer or vacuum type evaporators.

(B) *Damp digestion—laboratory equipment.*—Finely ground grain prepared as described in Example A was dampened with water in the ratio of 2 parts to 1 part water. Predissolved in the water used to dampen the grain was an amount of commercial enzyme preparation (same as described in Example A) equal to one-tenth of one percent based on the weight of grain used. This mixture, contained in a beaker, was placed in a boiling water bath for 30 min. during which time its internal temperature rose to 70–75° C. The beaker was then transferred to a pressure cooker where it was treated at 15 p.s.i.g. (121° C.) for 15 min. Part of the product was allowed to air dry to about 10% moisture content (later referred to as dry binder 1) and to the remainder was added sufficient water to provide a 1 part grain to 4 parts water ratio (later referred to as slurry binder 2).

(C) *Damp digestion—production type equipment.*—Various types of equipment may be adapted to our process either conventional or specially designed. In general the conditions of operation are within the scope of readily available equipment. An example is given below of the adaptability of the process to existing equipment such as a Patterson Kelly solid-liquid blender equipped for heat and pressure operation. The results obtainable with this type of equipment are directly comparable with scaled up commercial operations of the same type are shown below.

Twenty pounds of ground barley, 0.27 oz. of an active enzyme and 10 lbs. of water were blended in the P–K equipment and heated to a temperature of 121° C. (with corresponding steam pressure) the maximum temperature and pressure being attained after a heat-up period of 45 minutes during which time the enzymatic digestion proceeded followed by the hydrolytic step. The batch contents were cooled, discharged and air dried and then ground to a powder.

(II) Evaluation of hydrolytic products as pellets binders (A) Sets of pellets were prepared from low moisture alfalfa (about 8.3% moisture) and amounts of the pellet binders prepared as described in Example IA were mixed with chopped alfalfa, so that the binders contributed 1.5% grain solids and 9.0% water to the mixture. These pellets were prepared in a hand-operated press which had been standardized to give equivalent results to the commercially operated pelletizing machines. A series of tests employing various grains was made using shelled corn, whole corn (cob included) barley, oats and wheat. Control pellets were similarly prepared using 9% of water instead of the binders, prepared however under the same conditions of time, temperature and pressure.

The comparative quality of the pellets was evaluated by subjecting sets of six pellets to the physical action of a standardized washing machine type agitator for a period of 30 minutes followed by determination of particle size distribution by weight measurement. Particle size distribution was reduced by a standardized scoring system to a single number falling between 0 and 500. To indicate the pellet durability other methods may be employed for example by the standard treatment of the pellets in a rotating drum, after which they are shaken on a screen to remove the fines. The remaining weight divided by the original weight is the "Percent Durable" value. The first method outlined however is sufficiently reliable and reproducible to be accepted in part as the standard method of pellet testing by the American Association of Agricultural Engineers.

The results obtained in the present series of tests are shown below in Table 1.

TABLE 1

| Grain | Quality index | Density lbs./ft.³ |
| --- | --- | --- |
| Control | 313 | 32.0 |
| Shelled corn | 405 | 32.7 |
| Whole corn (cob included) | 412 | 33.3 |
| Barley | 408 | 32.8 |
| Oats | 412 | 31.6 |
| Wheat | 402 | 31.2 |

B. The values in Table 1 are representative but are relative and comparative only as the actual values depend upon the quality of the hay to be pelleted as well as that of the binder. For example in another set of comparative tests the processed grain was diluted with sufficient water to given a 7:1 water-dry grain ratio. This slurry was used to prepare pellets from low moisture hay (of poorer quality than that used in the first series) under conditions similar to those in Table 1. The resulting data presented in Table 2 show a marked improvement of the grain slurry binders over the control, but cannot be compared directly with those in Table 1.

TABLE 2

| Grain | Quality index | Density lbs./ft.³ |
| --- | --- | --- |
| Control | 194 | 33.7 |
| Shelled corn | 284 | 33.9 |
| Barley | 356 | 35.3 |

C. Hydrolyzed grains prepared according to the process of Example IB, dry binder 1, were ground to a fine powder and tested after storage.

(1) One part of air dried processed grain was stirred for a short time with seven parts of lukewarm water (60° C.) and this slurry was used as a binder for pellets from the low moisture hay used in Table 2. The results are shown in Table 3a.

TABLE 3a

| Grain | Quality index | Density lbs./ft.³ |
| --- | --- | --- |
| Control | 194 | 33.7 |
| Shelled corn | 323 | 35.2 |
| Barley | 372 | 37.9 |

The results presented in Table 3a clearly demonstrate that, if desired, the binder slurry can be dehydrated for purposes of storage or transit, then rehydrated at the time of use with no loss of binding qualities.

(2) The air dried processed grain was added as a powder to hay containing 20% moisture using 1.5% of the powder by weight. No water was added before or after the admixture of the binder with the forage. Pellets were prepared and tested in the same manner as already described.

TABLE 3b

| Grain | Quality index | Density lbs./ft.³ |
| --- | --- | --- |
| Control | 362 | 33.3 |
| Shelled corn | 436 | 35.4 |
| Barley | 456 | 34.2 |

(D) A binder prepared from barely according to the method of Example IC was added to and mixed with a complete steer feed at the 2.5% level. The ration was composed of 44% alfalfa hay (ground through a ½ inch screen) 48% shelled corn (ground through a ¼ inch screen), and 8% barley (ground through a 3/16 inch screen). The ration-binder mixture and the ration without added binder (both at 11.25% moisture content) were pelletized using a 7½ hp. Christy and Norris ring die pelleter with a ½ inch high-compression die. Rate of feed to the mill was controlled mechanically in each case at 517 lbs./hr. Likewise all other variables were held constant during the course of the test. The results of the test are presented in Table 4 below.

TABLE 4

| Moisture, percent | Binder, percent | Binder type | Percent durability average | |
| --- | --- | --- | --- | --- |
| | | | Green | Cured |
| 11.25 | 2.5 | Control | 50.1 | 57.0 |
| 11.25 | 2.5 | Barley | 79.3 | 85.7 |

The results in Table 4 are presented on the basis of the alternate test method referred to earlier.

Preferred forage materials for our process are alfalfa particularly, and grass hays such as timothy and the like; but the binder may also be used with a wide variety of forage crops and mixture thereof. We have also obtained good results with mixed rations (as shown in Example 4) consisting of a mixture of alfalfa and grains, and in general complete poultry, swine and cattle rations may be composited indicating flexibility of our binder and process. These are merely presented as examples without limiting the process thereto.

With regard to the size of the pellets, the choice depends upon the use. Usually the pellets for poultry feed are about ¼" diameter or slightly less. For larger animals the size of the pellet is proportionately larger for example the largest sizes for cows or steers would be in the shape of cylinders or cubes 2–3 inches in diameter or cubes.

With regard to the enzymes which may be used, we may employ any of the commercially available amylolytic or diastatic enzymes showing activity in liquefying starch or in enzymatic hydrolysis of starchy grains producing results of the type referred to and discussed above. Obviously those which exhibit a high degree of effectiveness in this respect and which in general convert high molecular weight carbohydrates to lower molecular fragments and more particularly which have proven effective as pellet binders for forage materials or mixtures or the mixtures of the same with grains are the preferred types. For example we have found that the Rohm and Haas Rhozyme H–39 commercial enzyme conforms to these requirements and may be used as a standard. (This is included in a group of heat stable liquefying diastases or diastatic enzyme preparations characterized by strong starch liquifying activity.) Of course other commercially available starch splitting enzymes have given satisfactory results. Obviously there are possibilities of improvement over those now available and it is intended that these of course may come within the scope of our invention. Generally speaking the amount of enzyme used relative to the other components in the system is less than about 0.5% and more than about 0.05% depending, of course, upon the strength of the enzyme preparation, the conditions of incubation and the grain to be hydrolyzed.

Moreover there are related substances such as Pectinol, which is the trade name of the Rhom and Haas Company for a group of pectic enzymes, and which contain enzyme systems capable of hydrolyzing maltose, sucrose, starch, cellulosic substances and carbohydrates in general and has even shown some activity in protein splitting and it is intended that this and similar types may come within the scope of our invention on a non-equivalent basis. In this connection we have found Pectinol R–10 ( a commercial enzyme) to be effective, illustrating its carbohydrate splitting activity in line with examples shown above.

As there are a number of possible variables in materials and conditions in connection with our product and processes it is of course to be understood that we desire to claim any such variations of our invention which may be construed as coming within the broad scope and spirit thereof and the appended claims pertaining thereto.

Having thus described our invention, what we claim is:

1. In a process for the production of compressed animal feed products which comprises compressing a mixture of subdivided forage material with an edible binder to produce a compact feed product, the improvement which comprises preparing said binder by subjecting a starchy material to an enzyme treatment in the presence of water and an enzyme having the property of hydrolyzing said starchy material and a cooking treatment at elevated temperatures and pressures to produce a product having binding properties, mixing said product with said subdivided forage material, and compressing the resulting mixture to produce said compressed animal feed product.

2. The process of claim 1 wherein said subdivided forage material includes crushed grain.

3. The process of claim 1 wherein said starchy material includes a grain selected from the group consisting of corn, wheat, rye, barley and oats.

4. The process of claim 1 wherein said binder is mixed with said subdivided forage material in an amount of from about 1 to 5 percent by weight.

5. The process of claim 1 wherein said enzyme treatment takes place during a heat-up period as said mixture of starchy material, water and enzyme is raised to said elevated temperature and pressures for said cooking treatment.

6. The process of claim 1 wherein said cooking treatment precedes said enzyme treatment.

7. The process of claim 1 wherein said product having binding properties is formed into an aqueous slurry prior to mixing the same with said subdivided forage material.

8. The process of claim 1 wherein said product having binding properties is dried prior to mixing the same with said subdivided forage material.

9. The process of claim 1 wherein said elevated pressures are from 15 to 100 p.s.i.g.

10. The product of the process of claim 1.

(References on following page)

References Cited

UNITED STATES PATENTS

| | | | |
|---|---|---|---|
| 422,370 | 3/1890 | Brott | 99—8 X |
| 2,372,666 | 4/1945 | Fenn | 106—210 |
| 2,609,326 | 9/1952 | Pigman et al. | 106—210 X |
| 2,647,854 | 8/1953 | Pfannmuller et al. | 106—210 X |
| 3,035,920 | 5/1962 | Knuclt | 99—8 |
| 3,218,786 | 11/1965 | Johnson et al. | 99—8 X |
| 3,336,137 | 8/1967 | Hickey | 99—2 |

A. LOUIS MONACELL, *Primary Examiner.*

J. M. HUNTER, *Assistant Examiner.*

U.S. Cl. X.R.

99—8